(12) United States Patent
Miyamoto

(10) Patent No.: US 7,901,775 B2
(45) Date of Patent: Mar. 8, 2011

(54) C/C COMPOSITE MATERIAL

(75) Inventor: Makoto Miyamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 11/187,849

(22) Filed: Jul. 25, 2005

(65) Prior Publication Data
US 2006/0025514 A1    Feb. 2, 2006

(30) Foreign Application Priority Data

Jul. 27, 2004   (JP) .................. 2004-219105
Jan. 24, 2005   (JP) .................. 2005-015399

(51) Int. Cl.
*B32B 9/00*   (2006.01)
(52) U.S. Cl. .................................... 428/408
(58) Field of Classification Search .......... 428/408, 428/312.2; 423/447.2, 447.1
See application file for complete search history.

(56) References Cited

U.S. PATENT DOCUMENTS

| 4,070,514 A | * | 1/1978 | Eatherly et al. | 428/64.1 |
| 4,567,086 A | * | 1/1986 | Fukuda et al. | 428/166 |
| 4,944,904 A | * | 7/1990 | Singh et al. | 427/399 |

FOREIGN PATENT DOCUMENTS

| JP | 2-124765 A | 5/1990 |
| JP | 06-048830 A | 2/1994 |
| JP | 8-59348 A | 3/1996 |
| JP | 2000-264744 A | 9/2000 |

* cited by examiner

*Primary Examiner* — David R Sample
*Assistant Examiner* — Daniel Miller
(74) *Attorney, Agent, or Firm* — Arent Fox LLP

(57) ABSTRACT

Disclosed is a C/C composite material precursor which gives a C/C composite material by calcination including: carbon fiber, a matrix, and void-forming core which is burnt out or reduces the volume thereof at lower temperatures than temperature of the calcination and forms a void which has openings on the surface of the C/C composite material after calcination. Also disclosed is a method for producing a C/C composite material by calcination of the precursor; and the composite material obtained by the calcination.

9 Claims, 10 Drawing Sheets

C/C COMPOSITE MATERIAL

BACKGROUND OF THE INVENTION

1. Field of the Invention

The present invention relates to a C/C composite material precursor, a C/C composite material, and a method for producing the C/C composite material.

2. Description of the Related Art

A C/C composite material (also referred to as "carbon/carbon composite material" and "carbon fiber reinforced carbon composite material"), which is one of composite materials formed of carbon fiber and a carbon matrix, has high specific strength and high specific rigidity for all its lightness in weight, and still has high strength even at a high temperature of 2,000° C. It is widely used in fields where reduction in weight is demanded, such as field of automobile and field of aerospace.

Such a C/C composite material is produced by, for example, laminating a predetermined number of prepregs (in FIG. 9, five prepregs 111A, 111B, 111C, 111D and 111E), subjecting the lamination to heat treatment to thereby obtain a C/C composite material precursor (carbon fiber reinforced plastic (CFRP) shaped body), and then subjecting to calcination (see Kokai Unexamined Japanese Patent Publication No. H2-124765, page 3, left column, line 10-page 4, left column, line 1).

In the case of a thick C/C composite material, such as one having a thickness of 30 mm or more, it is produced by laminating prepregs to form a element piece having a thickness of 25 mm or less, applying a mixture of phenolic resin and graphite powder between two element pieces to thereby adhere the element pieces, subjecting the adhered element pieces to hot pressing for curing the mixture to thereby obtain an intermediate, and then subjecting the intermediate to calcination (see Kokai Unexamined Japanese Patent Publication No. 2002-264744, paragraph 0007 and FIG. 3).

Generally, gas is generated by volatilization or decomposition of a matrix (substrate made of synthetic resin) of the prepeg during calcination. In the case of the method disclosed in the above document Kokai No. H2-124765, generated gas is trapped in the C/C composite material and may expand. Such gas may further combine with other gas trapped in the vicinity, leading to causing fissures 103 along the interface between two adjacent layers of the C/C composite material 101 and to separating the laminated layers, as shown in FIG. 10. It should be noted that the layers shown with the reference characters 101A, 101B, 101C, 101D and 101E in FIG. 10 correspond to the above-mentioned prepregs 111A, 111B, 111C, 111D and 111E, respectively.

To solve the above-mentioned problem, a trial has been made to prevent the layer separation in which production conditions, such as temperature and period of calcination, are properly controlled so as to gradually generate gas. However, the conditions have to be properly adjusted in accordance with provided various factors, such as thickness and material of prepreg, the number of prepreg sheets to be laminated and the amount of generated gas. As a result, it takes time and effort to produce a C/C composite material.

Likewise, in the method disclosed in the above document Kokai No. 2002-264744, more steps are required in which the intermediate is manufactured and then subjected to calcination, which also requires time.

Therefore, it would be desirable to provide: a C/C composite material precursor that facilitates production of a C/C composite material; a C/C composite material; and a method for producing the C/C composite material.

SUMMARY OF THE INVENTION

In one aspect of the present invention, a C/C composite material precursor is provided that includes carbon fiber, a matrix, and at least one void-forming core which is burnt out or reduces the volume thereof at lower temperatures than temperature of the calcination and forms a void which has openings on the surface of the C/C composite material after being subjected to the calcination.

In another aspect of the present invention, a method for producing a C/C composite material is provided that includes calcinating the C/C composite material precursor.

In further aspect of the present invention, a C/C composite material is provided that includes void communicating with the inside and the outside.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Figure 1:
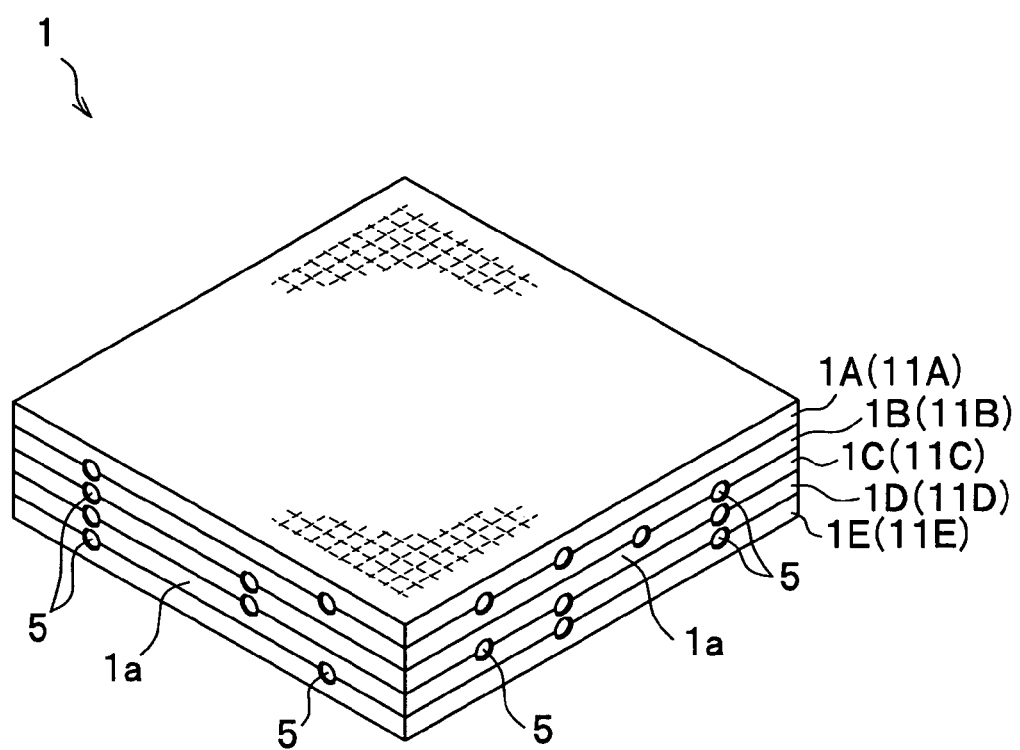
FIG. 1 shows a perspective view of a C/C composite material according to a first embodiment.

Embodiments of the present invention will be described below in detail with reference to the accompanying drawings. In the embodiments, the same components are designated with the same reference characters, and thus a duplicate description is omitted. The term "reduce" with respect to volume intended herein includes burning out the core, i.e. reducing its volume to zero.

First Embodiment

A first embodiment of the present invention will be explained below with reference to FIGS. 1-3.

FIG. 1 shows a perspective view of a C/C composite material according to a first embodiment. FIG. 2 shows an exploded perspective view of the C/C composite material in FIG. 1. FIG. 3 is a perspective view showing a step in which prepregs are laminated in a production process of the C/C composite material according to the first embodiment.

For convenience, in the explanation of a C/C composite material, five sheets of pregregs are used for lamination, thermal curing and calcination. However, this should not be construed as limitation of the number of layers in the present invention.

<Structure of C/C Composite Material>

As shown in FIG. 1, a C/C composite material according to a first embodiment is in a form of plate formed integrally of a first layer 1A, a second layer 1B, a third layer 1C, a fourth layer 1D and a fifth layer 1E, which correspond to five prepregs 11A, 11B, 11C, 11D and 11E (see FIG. 3), respectively. The C/C composite material 1 has a plurality of voids (pores) 5, 5, . . . spreading along the surface of each lamination layer from the side faces 1a, which are the outermost faces, to the interior of the C/C composite material 1 (see FIG. 2). In other words, the C/C composite material 1 has voids 5 which communicate from the interior to the outside and have openings on the side faces 1a (surfaces of the C/C composite material 1). It should be noted that the side face 1a corresponds to a face formed of end faces of prepregs 11A-11E that has been laminated.

However, the arrangement of the voids 5 should not be limited to the arrangement described above, and the voids 5 may be formed at random, or may have openings not only on the side faces 1a, but also on the upper face or the bottom face of the C/C composite material 1.

As explained above, by providing the C/C composite material 1 with the voids 5, the weight thereof is slightly lighter than the conventional C/C composite materials. Since the voids 5 are in elongated form, the separation of the layers which may be initiated from the voids does not occur during the use of the C/C composite material 1, and thus the presence of the voids 5 does not lower the strength to a large degree.

Since the voids 5 have openings on the side faces (outermost faces) 1a, the voids 5 can be easily sealed in order to prevent deterioration of the C/C composite material 1 initiated from the voids 5. Sealing of the voids 5 does not affect on the upper face and the bottom face (surfaces) of the C/C composite material 1, and irregularity is not formed on the upper and bottom faces.

The voids 5 are formed using a void-forming core (pore-forming member) 15, as will be explained below in the production process of the C/C composite material 1. Specifically, the voids are formed for the purpose of providing exhaust paths for gas generated by volatilization or decomposition of a matrix of a C/C composite material precursor (CFRP shaped body). Because of these voids, formation of fissures that may occur in the conventional C/C composite materials is prevented in the C/C composite material 1, and such a gas will not remain in the C/C composite material 1.

Such a C/C composite material 1 is formed of: carbon fiber having a long carbon length contained in the prepregs 11A-11E (see FIG. 3); and carbon content obtained by subjecting to calcination and carbonizing thermosetting resin contained in the prepregs 11A-11E. In other words, the C/C composite material 1 is light in weight and has high strength enforced by the above-mentioned carbon fiber.

Therefore, the C/C composite material 1 can be widely used in fields where high strength and reduction in weight are demanded, such as field of automobile and field of aerospace.

The C/C composite material 1 can be also used as reinforcement, i.e. metal substrate composite material (preform). Specifically, the voids 5 of the C/C composite material 1 are filled with molten metal, such as Si (silicon), to obtain metal substrate composite material. Because the C/C composite material 1 is used as reinforcement, such a metal substrate composite material is light in weight. Since the molten metal is packed in the voids 5 formed by the void-forming core 15 and distributed compactly and uniformly through the C/C composite material 1, the resultant metal substrate composite material has remarkably improved properties, such as strength.

<Method for Producing C/C Composite Material>

A method for producing the C/C composite material 1 will be explained below.

The method for producing the C/C composite material 1 according to a first embodiment includes: a first step in which the prepregs are laminated with the void-forming cores 15 being sandwiched between prepregs; a second step in which the laminated prepregs are subjected to heat treatment for curing to thereby obtain a C/C composite material precursor; and a third step in which the precursor is subjected to calcination.

Each step will be explained below.

<First Step: Lamination of Prepregs>

Figure 3:
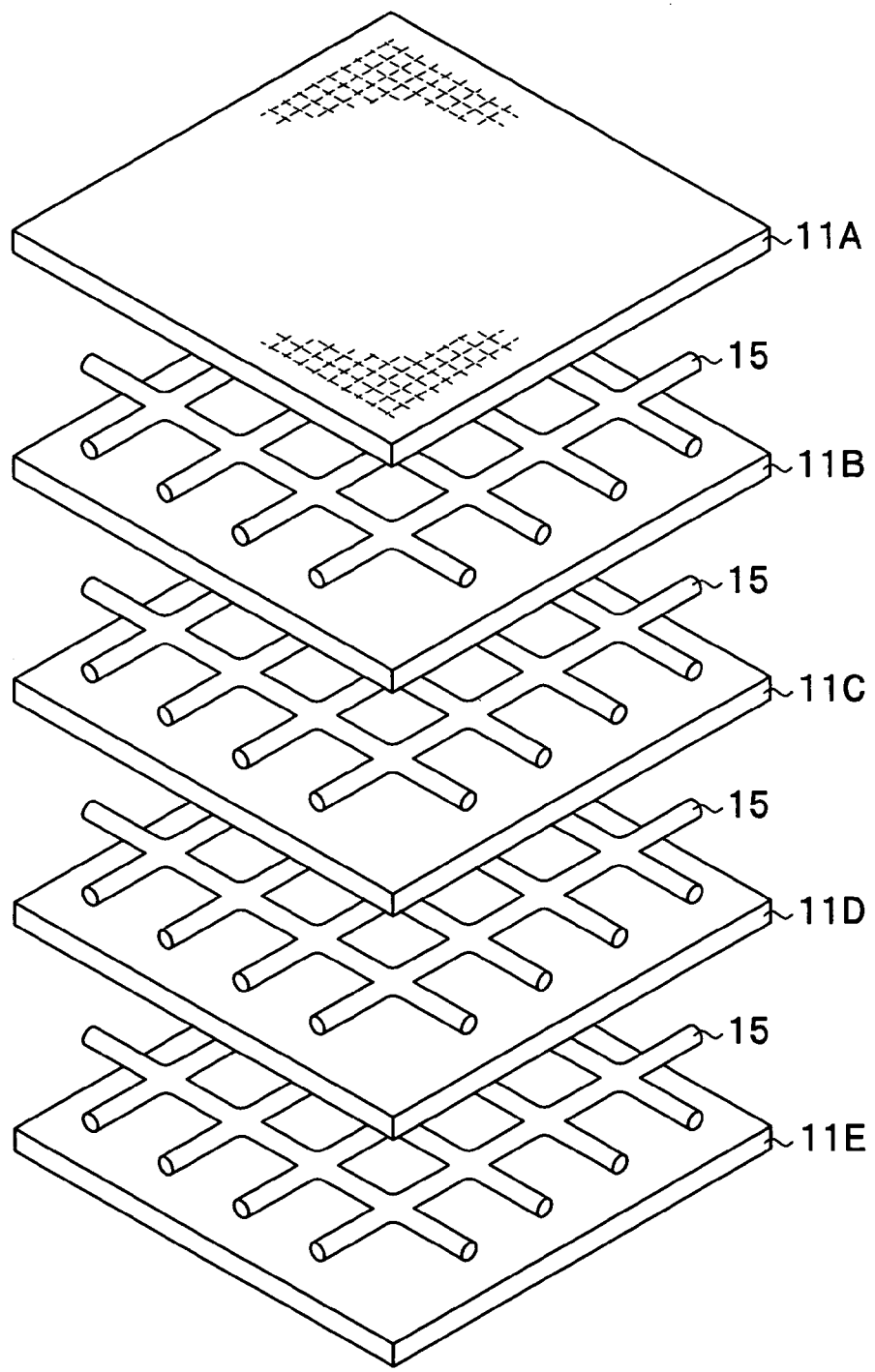
FIG. 3 is a perspective view showing a step in which prepregs are laminated in a production process of the C/C composite material according to the first embodiment.

As shown in FIG. 3, five prepregs 11A, 11B, 11C, 11D and 11E, and four void-forming cores 15, 15, . . . are alternately laminated (overlayed) so that a laminated prepreg structure is obtained. In other words, the structure is obtained in such a manner that each void-forming core 15 is sandwiched by two adjacent prepregs.

[Prepreg]

Each prepreg 11A-11E is obtained by weaving carbon fiber bundles, for example, in 0°/90° orientations, into a fabric and then impregnating the woven fabric with a synthetic resin, and can be appropriately selected from those commercially available. In general, the synthetic resin to be used for impregnating the woven fabric is thermosetting resin or thermoplastic resin, and examples include, but are not restricted to, phenolic resin (thermal decomposition temperature: approximately 360° C.), unsaturated polyester resin (thermal decomposition temperature: approximately 360° C.) and epoxy resin (thermal decomposition temperature: approximately 360° C.). The resultant synthetic resin with which the fabric was impregnated has a three-dimensional mesh structure, and is referred to as "matrix (substrate)."

[Void-Forming Member]

The void-forming cores 15 are members that are to be burnt out or to reduce the volumes thereof by calcination in the third step, which will be described below, to leave voids 5 which serve as exhaust paths for expelling out the gas generated by volatilization or decomposition of the matrix of the C/C composite material precursor (cured thermosetting resin) which will be described below.

There is no limitation with respect to the material of the void-forming core 15, as long as it can be burnt out or can reduce the volume thereof. However, it is preferred that the material be burnt out, since there is no residue of the void-forming core 15 remaining in the void after calcination. Specifically, the void-forming core 15 is formed of a material which is burnt out or reduces the volume thereof at higher temperatures than the curing temperature of the thermosetting resin contained in the prepregs 11A-11E, so that the void-forming core 15 does not vanish before the resin cures.

In the case where a curved C/C composite material is produced, the prepregs 11A-11E are deformed to have predetermined curve. Accordingly, it is preferred that the void-forming core 15 have flexibility so that the void-forming core 15 can be easily deformed in accordance with the deformation of the prepregs 11A-11E.

There is no limitation with respect to the shape of the void-forming core 15 as long as the void 5 is formed. However, it is preferred that the void-forming core 15 be in a form of mesh, from the viewpoint of gas exhaust effect. When the void-forming core 15 is in a form of mesh, the size and the thickness of the mesh is appropriately selected so that the void 5 formed corresponding to the void-forming core 15 dose not lower mechanical strength of the C/C composite material 1 after the production thereof.

Examples of the void-forming core 15 in a form of mesh that meets the above conditions include, but are not restricted to: a mesh made of cotton thread (thermal decomposition temperature: 200-300° C.) arranged with 5 mm spaces; a gauze; a nonwoven fabric; cotton; fiber (e.g. nylon fiber) made of thermoplastic resin (e.g. polyamide, polypropylene and polyester).

<Second Step: Thermal Curing, Production of C/C Composite Material Precursor>

Next, the lamination in which the prepregs 11A-11E and the void-forming cores 15 are alternately layered is subjected to heat treatment at a predetermined temperature in an autoclave or the like, thereby curing the thermosetting resin mentioned above, to obtain the C/C composite material precursor (prepreg shaped body, carbon fiber reinforced plastic (CFRP) shaped body). That is, in this step, the matrix made of uncured thermosetting resin contained in the prepregs 11A-11E is cured to be a matrix of the C/C composite material precursor (CFRP shaped body).

Briefly, the C/C composite material precursor includes: the carbon fiber contained in the prepregs 11A-11E; the thermally cured matrix; and four void-forming cores 15 sandwiched between the prepregs 11A-11E.

<Third Step: Calcination>

Next, burrs are removed from the C/C composite material precursor, and the precursor is placed in an appropriate furnace and subjected to calcination at a predetermined temperature (e.g. 2,000° C.) for a predetermined period of time, to thereby carbonize the matrix (above-mentioned cured thermosetting resin) of the C/C composite material precursor and obtain the C/C composite material 1. It is preferred that the furnace be purged with gas, such as argon gas, to obtain inert gas atmosphere in order to prevent oxidization.

During calcination, the void-forming cores 15 are burnt our or reduce the volumes thereof. As a result, where there were the void-forming cores 15, voids 5 having openings on the side faces of the prepreg shaped body (end faces of the laminated prepregs) are formed along the interface of the laminated layers. Specifically, the voids 5 corresponding to the void-forming cores 15 are formed that communicate with the inside and the outside.

Figure 2:
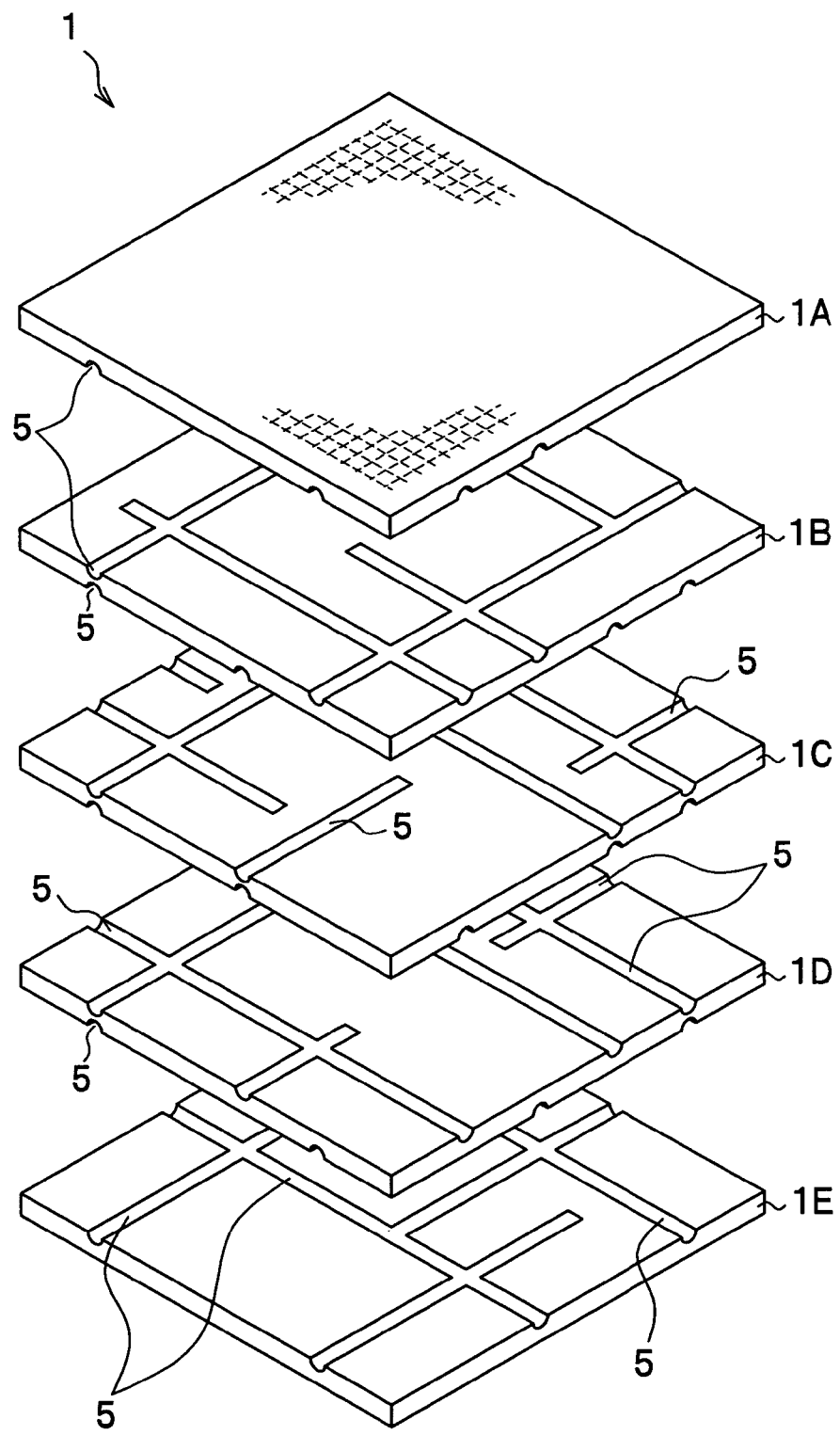
FIG. 2 shows an exploded perspective view of the C/C composite material in FIG. 1.

As shown in FIG. 2, the voids 5 do not have to be formed corresponding fully to the entire void-forming cores 15, and may be formed corresponding to only the parts of the void-forming cores 15.

Figure 10:
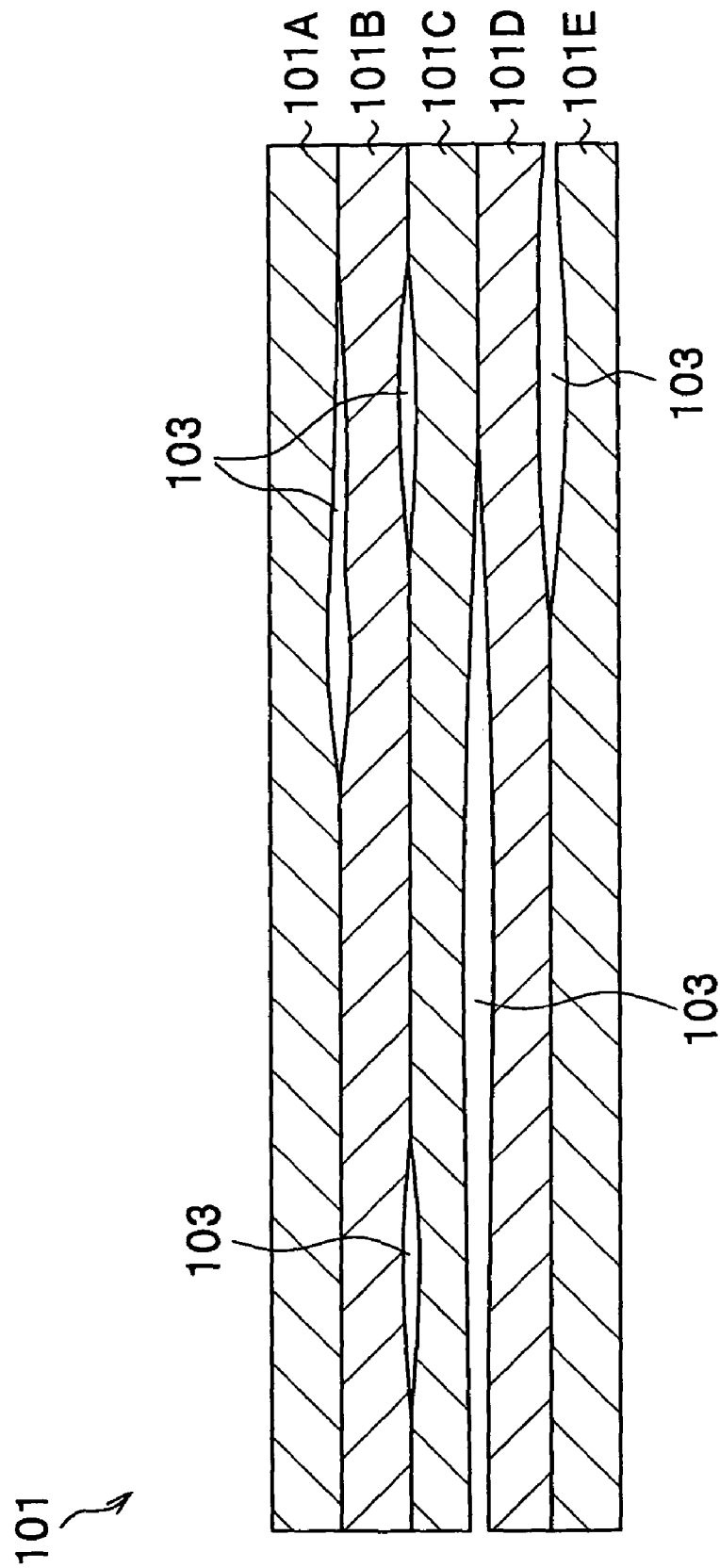
FIG. 10 shows a sectional view of the conventional C/C composite material.

Therefore, in calcination, gas generated by volatilization or decomposition of the matrix (above-mentioned cured thermosetting resin) of the C/C composite material precursor is exhausted to the outside of the prepreg shaped body through the voids 5 as exhaust paths. In other words, the generated gas tends not to remain inside the C/C composite material precursor. For this reason, unlike the conventional C/C composite materials, gas will not expand or combine with other gas trapped in the vicinity, which prevents the formation of fissures 103 (see FIG. 10).

As a result, the C/C composite material 1 which does not have separation of laminated layers can be obtained after calcination.

Accordingly, the method for producing the C/C composite material 1 according to the first embodiment requires less time and effort, since the production process of the C/C composite material precursor requires simply laminating a predetermined number of the prepregs and sandwiching the void-forming cores 15 therebetween. In addition, even in the case where the production of a thicker C/C composite material 1 is desired, such a C/C composite material can be easily obtained simply by increasing the number of the prepreg layers.

Second Embodiment

Figure 4:
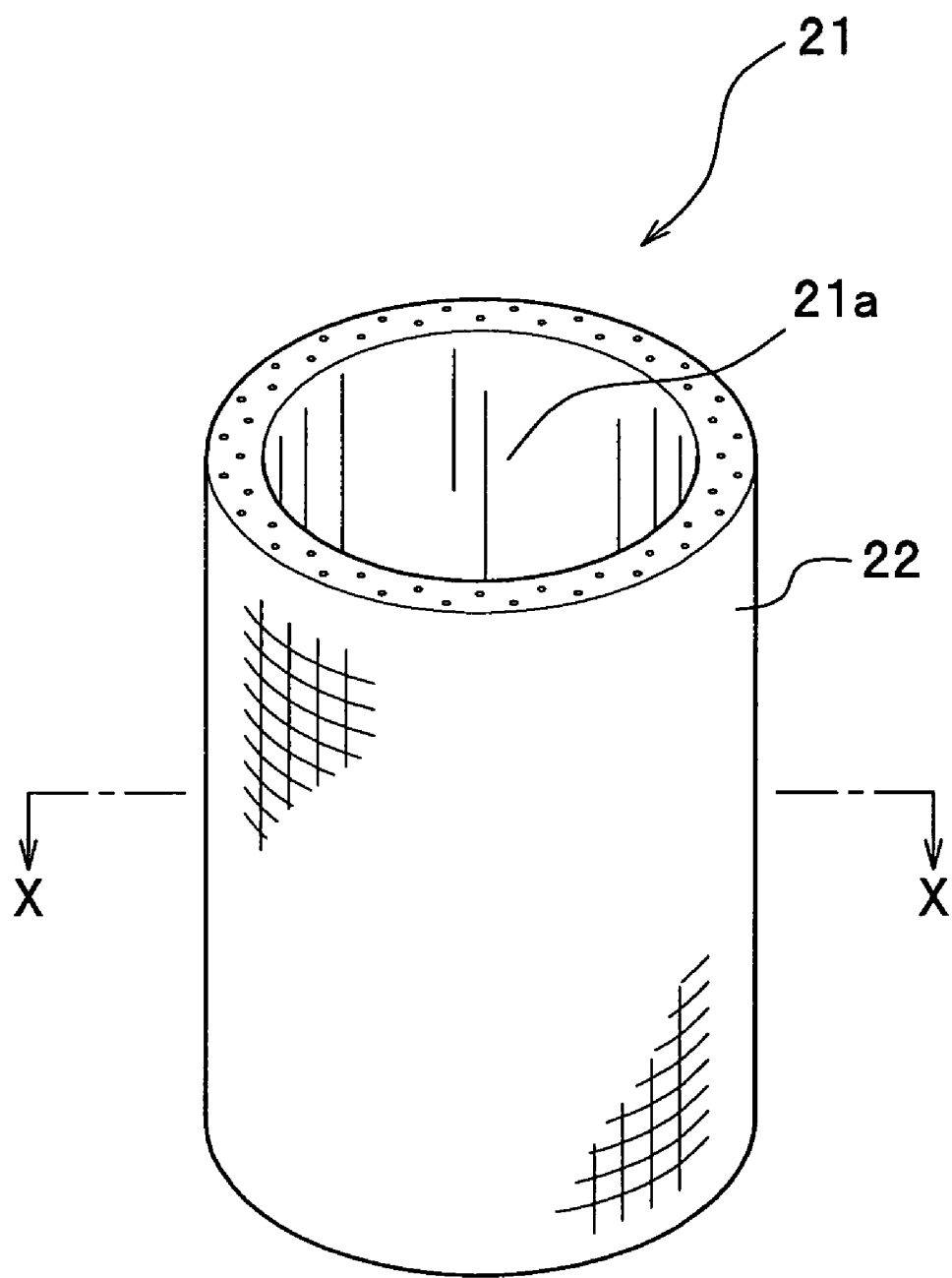
FIG. 4 shows a perspective view of a C/C composite material according to a second embodiment.
Figure 5A:
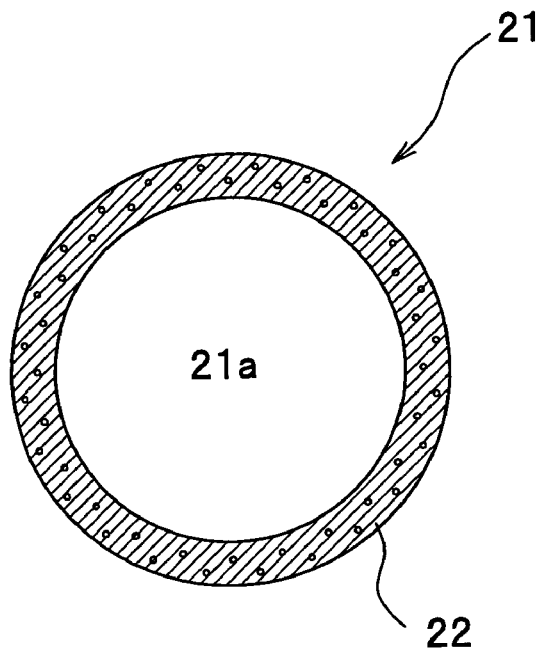
FIG. 5A shows a sectional view of the C/C composite material taken along the line X-X in FIG. 4.
Figure 5B:
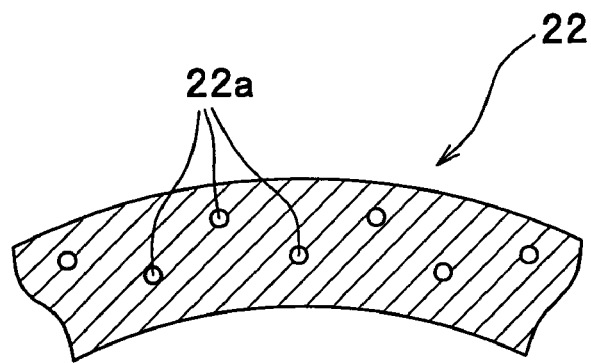
FIG. 5B shows an enlarged view of a part of the C/C composite material in FIG. 5A.
Figure 6:
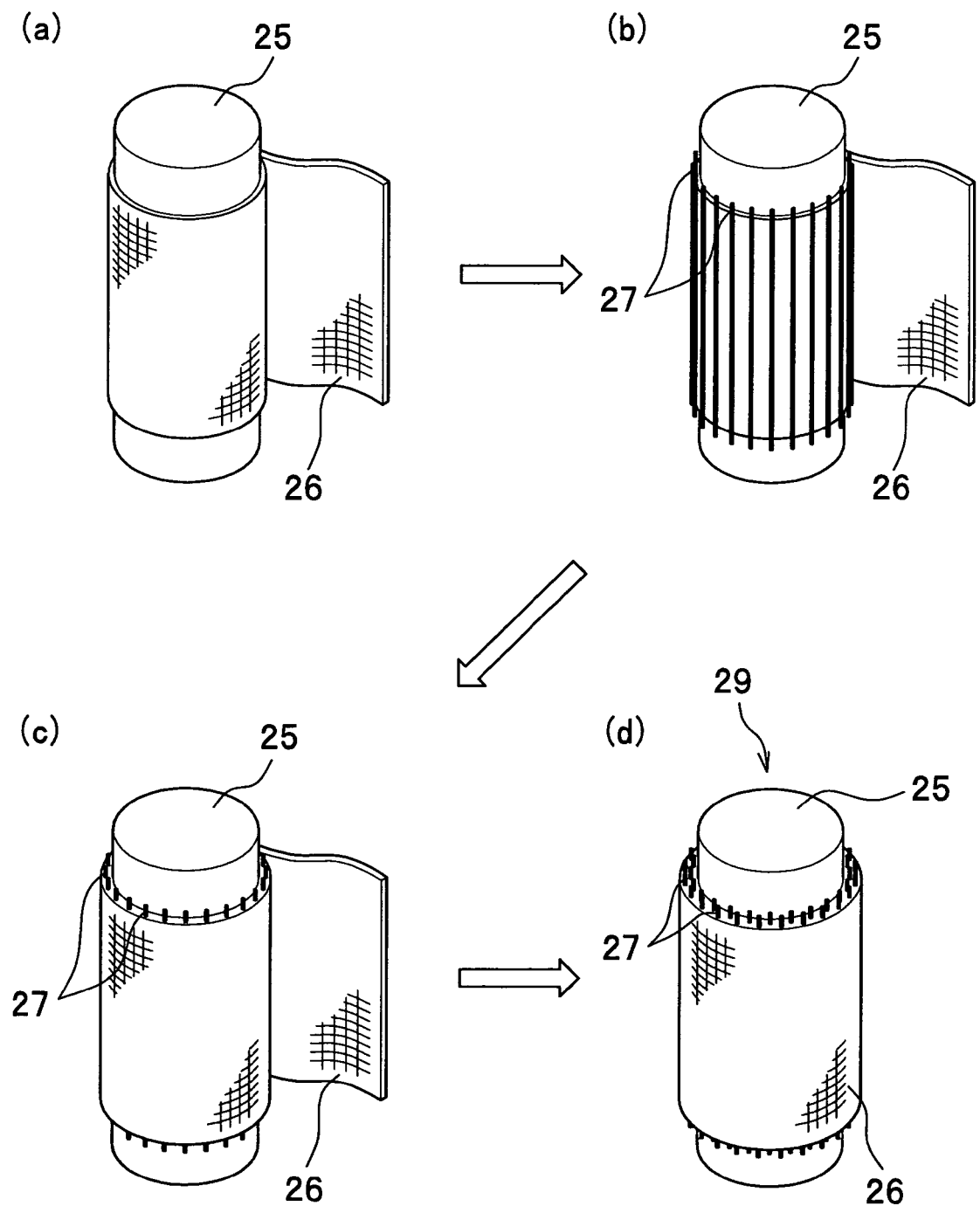
FIG. 6 shows a perspective view of the steps of production process of the C/C composite material according to the second embodiment.

A second embodiment of the present invention will be described below with reference to FIGS. 4-6. FIG. 4 shows a perspective view of a C/C composite material according to a second embodiment. FIG. 5A shows a sectional view of the C/C composite material taken along the line X-X in FIG. 4, and FIG. 5B shows an enlarged view of the part of the C/C composite material in FIG. 5A. FIG. 6 shows a perspective view of the steps of production process of the C/C composite material according to the second embodiment; (a) shows a step in which a prepreg is started to be rolled up around a hollow-forming core; (b) shows a step in which void-forming cores are positioned around the prepreg; (c) shows a step in which the rolling-up of the prepreg is in progress; and (d) shows a resultant C/C composite material precursor.

<Structure of C/C Composite Material>

The structure of the C/C composite material according to the second embodiment will be explained below, with reference to FIGS. 4 and 5.

As shown in FIG. 4 and FIG. 5A, the C/C composite material 21 according to the second embodiment is in a form of cylinder (pipe), and has a hollow space 21a. In the hollow space 21a, fluid, such as exhaust gas, is allowed to pass through.

As will be explained below in a method for producing the C/C composite material 21, such a C/C composite material 21 is formed of: carbon fiber having a long carbon length contained in the prepreg 26 (see FIG. 6); and carbon content obtained by subjecting to calcination and carbonizing thermosetting resin contained in the prepreg 26. In other words, the C/C composite material 21 is light in weight and has high strength enforced by the above-mentioned carbon fiber.

Therefore, like the C/C composite material 1 according to the first embodiment, the C/C composite material 21 can be widely used in fields where high strength and reduction in weight are demanded, such as field of automobile and field of aerospace.

A periphery 22 of the C/C composite material 21 has a number of voids (pores) in an axial direction of the C/C composite material 21, as shown in FIG. 5B. A plurality of voids 22a are arranged with predetermined spaces therebetween in a circumferential direction, and in plural tiers (in FIG. 5B, two tiers) in a radial direction. The voids 22a have openings on an upper end face and a bottom end face (surfaces) of the C/C composite material 21.

Therefore, the periphery 22 of the C/C composite material 21 has thermal insulation property. For example, even when a fluid of a high temperature passes through the hollow space 21a, the heat will not be easily conducted to the outside of the C/C composite material 21.

However, the arrangement of the voids 22a should not be limited to the arrangement described above, and the voids 22a may be formed at random, or may have openings not only on the upper and bottom end faces, but also on the inner and outer peripheries of the C/C composite material 21.

<Method for Producing C/C Composite Material>

A method for producing the C/C composite material 21 will be explained below with reference mainly to FIG. 6.

The method for producing the C/C composite material 21 according to the second embodiment includes: a first step in which the prepreg 26 is rolled up; a second step in which the rolled prepreg 26 is subjected to heat treatment for curing to thereby obtain a C/C composite material precursor 29 (CFRP shaped body); and a third step in which the C/C composite material precursor 29 is subjected to calcination.

Each step will be explained below.

<First Step: Rolling up Prepreg>

As shown in (a)-(c) in FIG. 6, the prepreg 26 is rolled up around the hollow-forming core 25, while sandwiching the void-forming cores (pore forming member) 27, 27, . . . between two different portions of the prepreg 26. Spaces between the void-forming cores 27, 27, . . . in a circumferential direction, spaces between the void-forming cores 27 in a radial direction (for example, the cores 27 are positioned around every roll of the prepeg 26), and the number of turns of the prepreg 26 rolled up (for example, 10 turns) are properly selected based on the arrangement of the voids 22a in the completed C/C composite material 21 (after calcination) and the thickness of the periphery 22 (see FIGS. 5A and 5B).

[Core]

The core 25 is a columnar body (for example, having a diameter of 50 mm and a height of 200 mm) corresponding to a hollow space 21a, for providing the C/C composite material 21 with the hollow space 21a when the production is completed.

The hollow-forming core 25 according to the second embodiment is formed of a material which is burnt out at lower temperatures than calcination temperature in the third step which will be described below. For this property, the hollow-forming core 25 is burnt out during calcination and the hollow space 21a is formed. In other words, there is no need to remove the hollow-forming core 25, and the precursor 29 can be subjected to calcination while the hollow-forming core 25 is still present in the precursor 29. Examples of material for the hollow-forming core 25 include, but are not restricted to, thermoplastic resin, such as polyamide, polypropylene and polyester.

[Prepreg]

The prepreg 26 is a girdlelike body obtained by weaving carbon fiber bundles into a fabric and then impregnating the woven fabric with a synthetic resin, and can be appropriately selected from those commercially available. Further explanations are omitted here since other properties of the prepreg 26 according to the second embodiment are substantially the same as those of the prepregs 11A-11E according to the first embodiment.

[Void-Forming Core]

The void-forming cores 27 are members that are to be burnt out or to reduce the volumes thereof by calcination in the third step, which will be described below, to leave voids 22a in the periphery 22 of the C/C composite material 21 (see FIG. 5B). The size of the void-forming core 27 is selected based on the desired size of the void 22a (for example, diameter of 0.7 mm and length of 200 mm).

The voids 22a formed by the void-forming cores 27 serve as exhaust paths for expelling out the gas generated by volatilization or decomposition of the matrix of the C/C composite material precursor 29 (cured thermosetting resin) in calcination in the third step which will be described below.

There is no limitation with respect to the material of the void-forming core 27, as long as it can be burnt out or can reduce the volume thereof to form the void 22a in the periphery 22. However, it is preferred that the material be burnt out, since there is no residue of the void-forming core 27 remaining in the void after calcination.

Specifically, the void-forming core 27 is formed of a material which is burnt out or reduces the volume thereof at higher temperatures than the curing temperature of the thermosetting resin contained in the prepreg 26, so that the void-forming core 27 does not vanish before the resin cures.

It is also preferred that the void-forming core 27 have flexibility so that the voids 22a having desired shape can be formed in the C/C composite material 21.

There is no limitation with respect to the shape of the void-forming core 27 as long as the void 22a is formed. With this second embodiment, FIG. 6 illustrates the void-forming core 27 formed of fiber (e.g. nylon fiber) made of thermoplastic resin (e.g. polyamide, polypropylene and polyester).

<Second Step: Thermal Curing, Production of C/C Composite Material Precursor>

Next, the rolled-up prepreg body prepared in the first step in which the prepreg 26 was rolled up together with the void-forming cores 27 is subjected to heat treatment at a predetermined temperature (for example 150° C.) under a predetermined pressure (for example 709 kPa (7 atm)) in an autoclave or the like, thereby curing the thermosetting resin in the prepreg 26, to obtain the C/C composite material precursor 29 shown in (d) in FIG. 6. That is, in this step, the matrix made of uncured thermosetting resin contained in the prepreg 26 is cured to be a matrix of the C/C composite material precursor 29.

Briefly, the C/C composite material precursor 29 includes: the carbon fiber contained in the prepreg 26; the thermally cured matrix; and a plurality of void-forming cores 27, 27, . . . rolled up together with the prepreg 26.

<Third Step: Calcination>

Next, burrs are removed from the C/C composite material precursor 29, and the precursor 29 is placed in an appropriate furnace and subjected to calcination at a predetermined temperature (e.g. 2,000° C.) for a predetermined period of time, to thereby carbonize the matrix (above-mentioned cured thermosetting resin) of the C/C composite material precursor 29 and obtain C/C composite material 21. It is preferred that the furnace be purged with gas, such as argon gas, to obtain inert gas atmosphere in order to prevent oxidization.

During calcination, the void-forming cores 27 are burnt out or reduce the volumes thereof. As a result, where there were the void-forming cores 27, voids 22a having openings on the upper and bottom end faces of the C/C composite material precursor 29 (end faces of the rolled prepreg) are formed. Specifically, the voids 22a corresponding to the void-forming cores 27 are formed that communicate with the inside and the outside.

The voids 22a do not have to be formed corresponding fully to the entire void-forming cores 27, and may be formed corresponding to only the parts of the void-forming cores 27.

Therefore, in calcination, gas generated by volatilization or decomposition of the matrix (above-mentioned cured thermosetting resin) of the C/C composite material precursor 29 is exhausted to the outside of the prepreg shaped body through the voids 22a as exhaust paths. In other words, the generated gas tends not to remain inside the C/C composite material precursor 29.

In calcination, the hollow-forming core 25 is burnt out and leaves a hollow space 21a.

In this manner, the C/C composite material 21 having a hollow space 21a can be obtained.

As described above, with the method for producing the C/C composite material 21 according to the second embodiment, the C/C composite material precursor 29 can be easily obtained by rolling up the prepreg 26 around the hollow-forming core 25 together with the void-forming cores 27 sandwiched between two different portions of the prepreg 26; and subjecting the rolled-up prepreg to thermal curing. In addition, by calcining the precursor 29, the C/C composite material can be easily obtained which is reinforced with carbon fiber and has thermal insulation property due to the presence of the voids 22a.

In the case where the production of a C/C composite material having improved thermal insulation property is desired, such a composite material can be easily obtained simply by appropriately adjusting the number of the void-forming cores 27 rolled up together with the prepreg 26, to thereby increase the number of the voids 22a in the periphery 22.

In the case where the production of a thicker C/C composite material 21 is desired, such a C/C composite material can be easily obtained simply by increasing the number of turns of the prepreg 26.

The present invention is not limited to the particular embodiments discussed above and may be carried out in various modified forms without departing from the scope of the present invention, examples of which will be described below.

Figure 7:
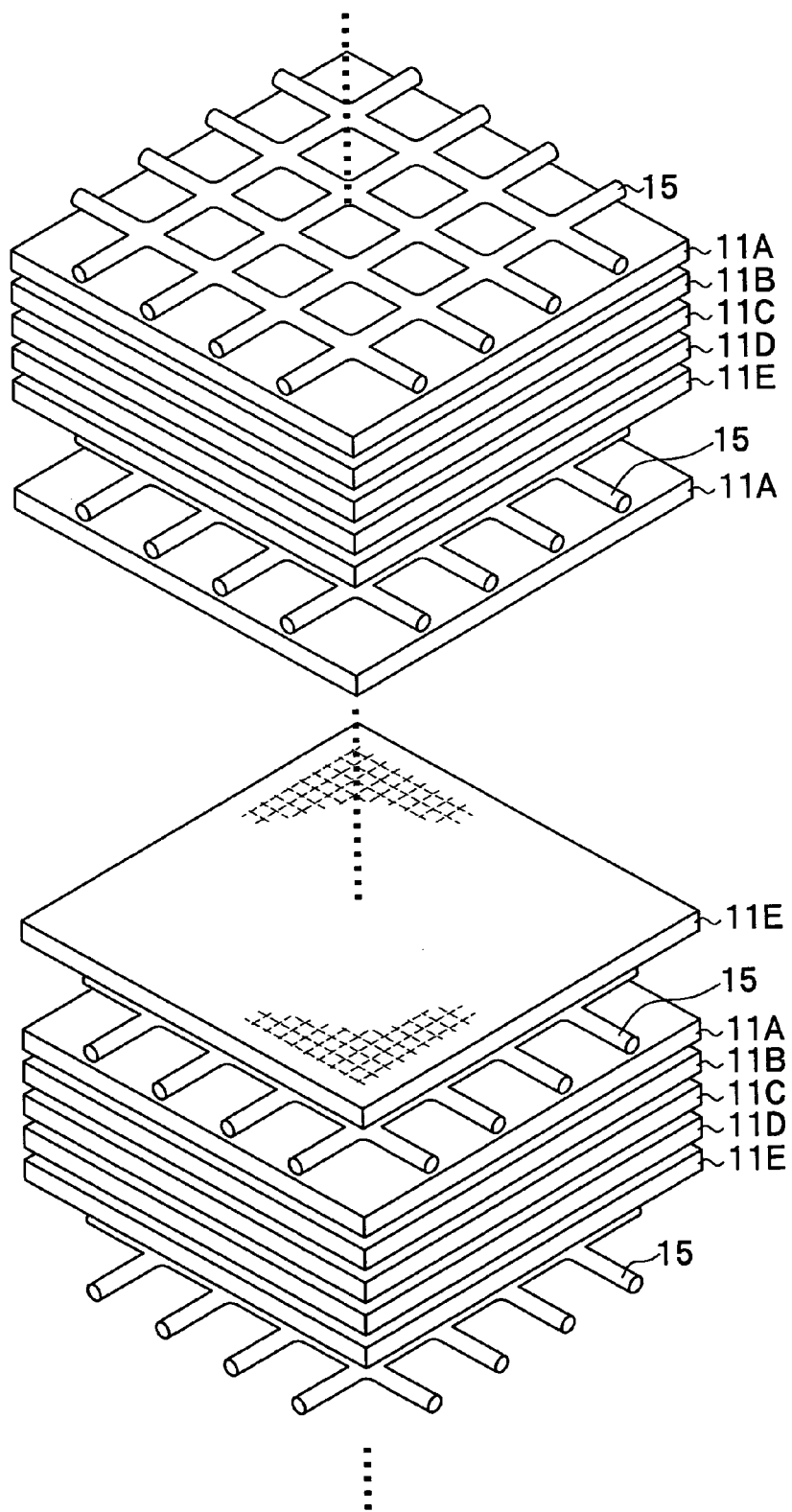
FIG. 7 shows a perspective view in which prepregs are laminated in a production process of a C/C composite material according to a modified embodiment of the first embodiment.

For example, in the step to laminate the prepregs 11A-11E according to the first embodiment, each void-forming core 15 is sandwiched between two adjacent prepregs (see FIG. 3), however, the number (pitch) of prepregs to sandwich the void-forming core 15 is not limited to one. In the case where many prepregs are laminated to produce a C/C composite material, every five prepregs may sandwich the void-forming core 15, as shown in FIG. 7. The number (pitch) of the prepregs to sandwich the void-forming core 15 can be appropriately selected based on, for example, thickness of the prepreg, types of the matrix of the prepreg (i.e., types of the synthetic resin contained in the prepreg) and the amount of the generated gas.

In the first embodiment, the void-forming core 15 is in a form of mesh. However, the void-forming core 15 may be in a different form, such as a form of bar that is burnt out or reduces the volume thereof by calcinations, and may be arranged with predetermined spaces.

In the first embodiment, the C/C composite material 1 is in a form of flat plate, for the sake of easy understanding. However, the C/C composite material 1 may be in a different form, such as a curved plate. In this case, prepregs 11A-11E and void-forming cores 15 are formed to have a curvature, laminated, and subjected to thermal curing and to calcination. In other words, the C/C composite material precursor can have a curvature corresponding to the desired curvature of the resultant C/C composite material 1.

In the first embodiment, the C/C composite material precursor is produced by laminating a plurality of prepregs 11A-11E with the void-forming cores 15 being sandwiched therebetween and subjecting to heat treatment. However, there is no limitation with respect to the configuration of the C/C composite material precursor, as long as the precursor contains carbon fiber, a matrix and void-forming cores 15.

Examples of such configurations include, but are not restricted to: (1) a liquid form obtained by impregnating a preform formed of carbon fiber with thermosetting resin in an uncured liquid state and adding void-forming cores 15 thereto; and (2) a form obtained by mixing carbon fiber, thermosetting resin in an uncured liquid state (binder) and void-forming cores 15 and shaping the mixture into a predetermined configuration. To put it shortly, the matrix of the C/C composite material precursor is not necessarily formed of cured thermosetting resin as described in the first embodiment, but may be formed of thermosetting resin in an uncured liquid state, or even of thermoplastic resin.

In the first embodiment, the void-forming core 15 is in a form of mesh. However, in the case where the void-forming cores 15 are mixed with the carbon fiber and the thermosetting resin in an uncured liquid state as in the above item (2), the void-forming core 15 maybe in a form of long fiber. Alternatively, the void-forming cores 15 may be woven in advance with carbon fiber that form prepregs 11A-11E.

Likewise in the second embodiment, there is no limitation with respect to the configuration of the C/C composite material precursor 29. Examples of such configurations include, but are not restricted to: (1) a liquid form obtained by impregnating a preform formed of carbon fiber with thermosetting resin in an uncured liquid state and adding void-forming cores 27 thereto; and (2) a form obtained by mixing carbon fiber, thermosetting resin in an uncured liquid state and void-forming cores 27 and shaping the mixture into a predetermined configuration. To put it shortly, the matrix of the C/C composite material precursor 29 is not necessarily formed of cured thermosetting resin as described in the second embodiment, but may be formed of thermosetting resin in an uncured liquid state or even of thermoplastic resin. As described above, when prepreg(s) in a solid form is used to form the C/C composite material precursor 29, it is preferable that the void-forming core(s) 27 be sandwiched by two different portions of the same prepreg or different prepregs.

In the method for producing the C/C composite material according to the second embodiment, the hollow-forming core 25 made of thermosetting resin is burnt out by calcination in the third step to obtain the hollow space 21a in the C/C composite material 21. However, the hollow space may be obtained by removing the hollow-forming core 25 from the C/C composite material precursor 29 prior to calcination. In this case, the hollow-forming core 25 may be formed of a material which is difficult to be burned out by calcination, i.e. difficult to transform into gas (for example, metal such as stainless steel).

In the second embodiment, the prepreg 26 is rolled up together with the void-forming cores 27 each in a form of fiber (bar) sandwiched between two different portions of the prepreg 26. However, there is no limitation with respect to the shape of the void-forming core 27, and the void-forming core 27 may be in a form of, for example, mesh. When the void-forming core 27 is in a form of mesh, the size and the thickness of the mesh is appropriately selected so that after the production the separation does not occur in a radial direction in the periphery 22 of the C/C composite material, which may be initiated from the voids 22a formed corresponding to the void-forming core 27.

Figure 8A:
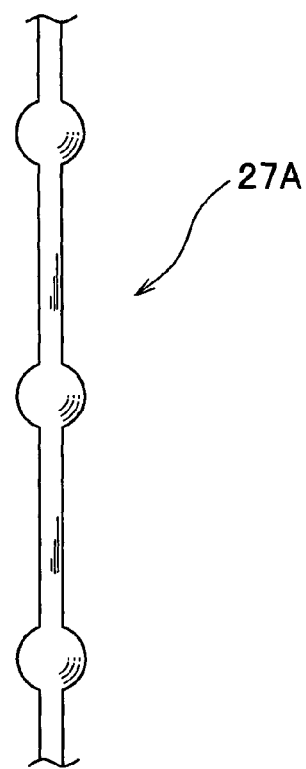
FIG. 8A shows a side view of a void-forming core to be used in a method for producing a C/C composite material according to a modified embodiment of the second embodiment.
Figure 8B:
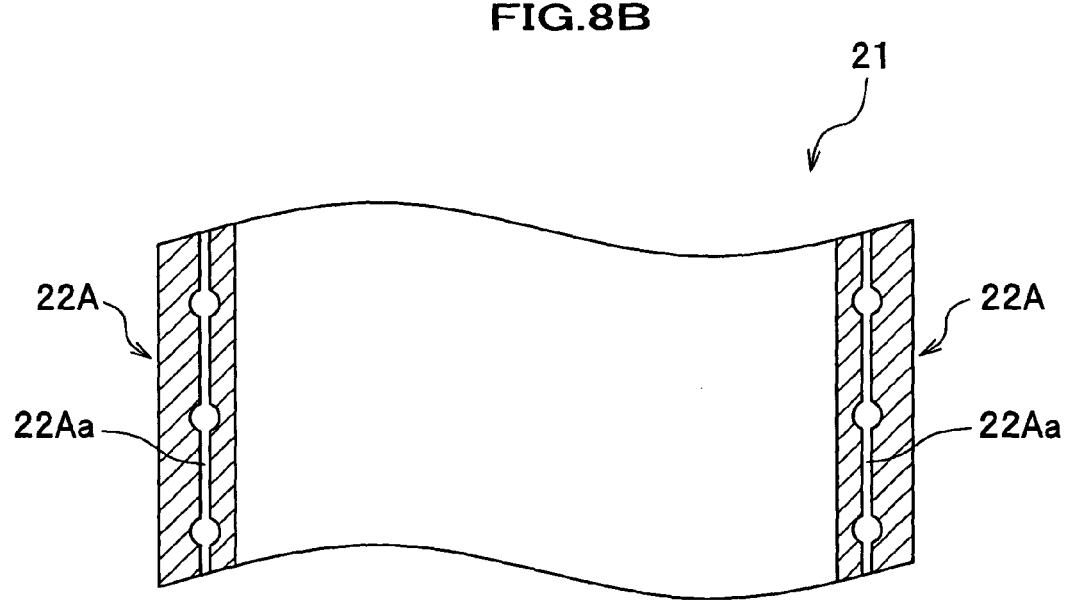
FIG. 8B shows an enlarged sectional side view of a part of a C/C composite material in the case where the void-forming core shown in FIG. 8A was used.
Figure 9:
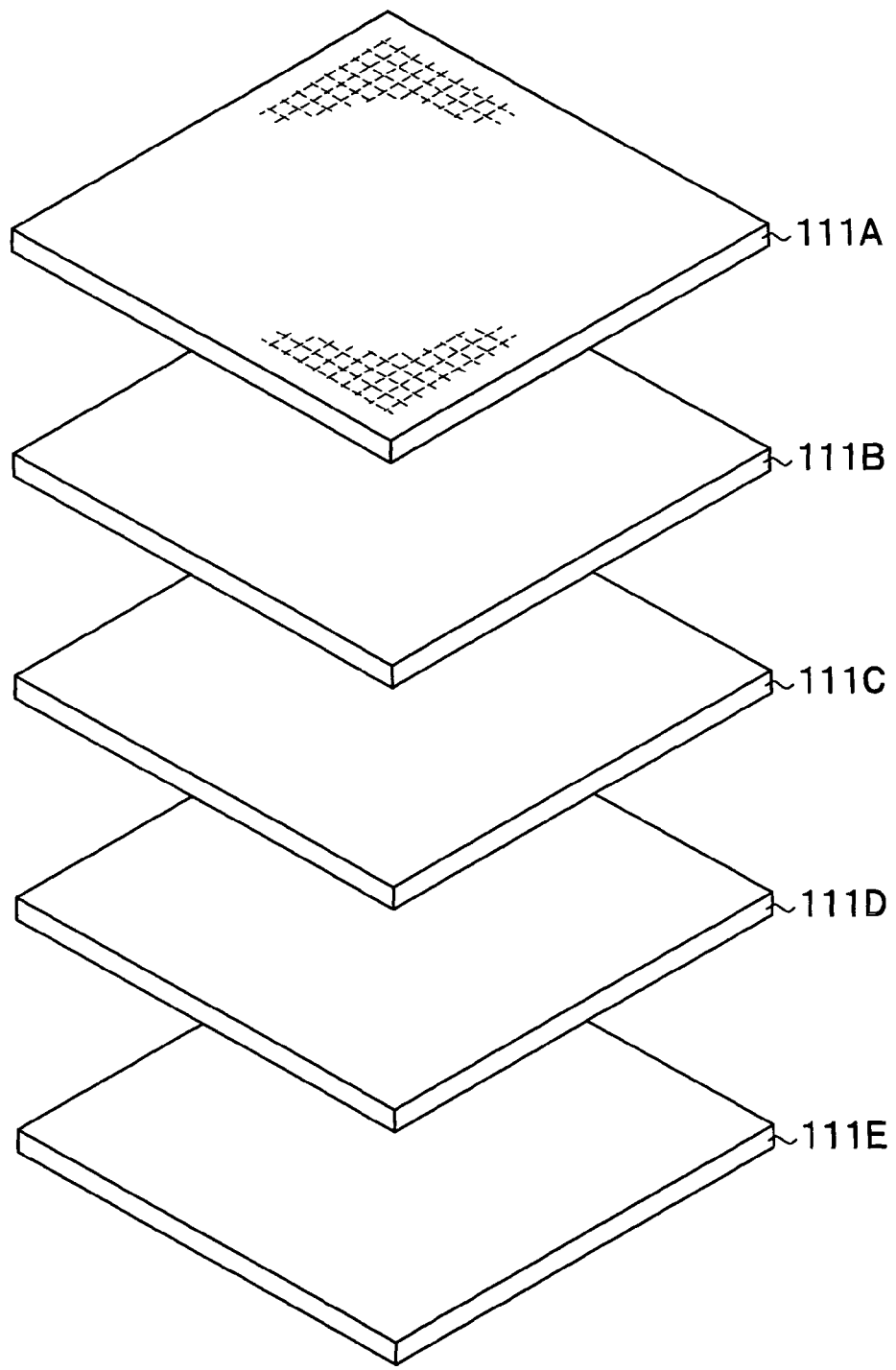
FIG. 9 is a perspective view showing a step in which prepregs are laminated in a production process of a conventional C/C composite material.

In the second embodiment, instead of the void-forming core 27, a void-forming core 27A having larger diameters at some portions along the core as shown in FIG. 8A may be used. When such void-forming cores 27A are used, the voids 22Aa each having enlarged diameters at some portions along the void is formed in the periphery 22A. With this structure, the amount of air contained in the periphery 22A is increased, and as a result, the thermal insulation effect of the periphery 22A is enhanced. In addition, the void 22Aa includes a plurality of spherical spaces (cells) and communicating paths each of which communicates with two adjacent spherical spaces. In other words, the spherical space serves as nearly an independent space (bubble), which also enhances the thermal insulation effect of the periphery 22A.

What is claimed is:

1. A calcinated C/C composite material comprising:
a plurality of identical layers, each layer having at least two pairs of parallel and opposing side surfaces and being formed of a carbonaceous material comprising carbon fiber and a matrix; and
at least one void-forming core surrounded by a pair of adjacent layers of the plurality of layers, wherein the at least one void-forming core is made of a material that is burnt out at lower temperatures than a calcination temperature to form a void which defines openings in at least one side surface of each pair of side surfaces of said each layer after the C/C composite material is subjected to calcination, wherein the void contains air that thermally insulates the C/C composite material; and
wherein the plurality of layers are laminated on top of each other and the at least one void-forming core extends between opposing surfaces of each pair of adjacent layers to form the void between the opposing surfaces of each pair of adjacent layers.

2. The calcinated C/C composite material according to claim 1, wherein the plurality of layers are rolled so that different portions of individual layers overlap each other to form an approximate cylindrical shape; and the at least one void-forming core extends between opposing surfaces of the portions of the overlapped layers to form the void between the opposing surfaces of the portions of the overlapped layers.

3. The calcinated C/C composite material according to claim 1, wherein the void-forming core is a mesh.

4. The calcinated C/C composite material according to claim 1, wherein the void communicates an interior of the C/C composite material with an exterior of the C/C composite material.

5. The calcinated C/C composite material according to claim 4, wherein the void is formed in each layer of the plurality of layers.

6. The calcinated C/C composite material according to claim 4, wherein the void is formed in each side surface of a same layer.

7. The calcinated C/C composite material according to claim 1, wherein opposing and parallel side surfaces of the C/C composite material are formed by the side surfaces of the plurality of layers.

8. The calcinated C/C composite material according to claim 1, wherein the void is formed in at least one of a top surface and a bottom surface of the C/C composite material.

9. A method for producing a C/C composite material comprising calcinating the C/C composite material precursor according to any one of claims 1, 2 or 3.

* * * * *